Dec. 4, 1951 B. H. VON PENTZ 2,577,169
OIL FILTER
Filed March 29, 1949 2 SHEETS—SHEET 1
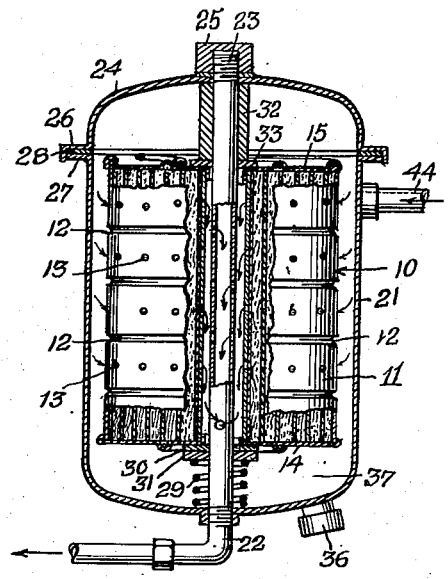
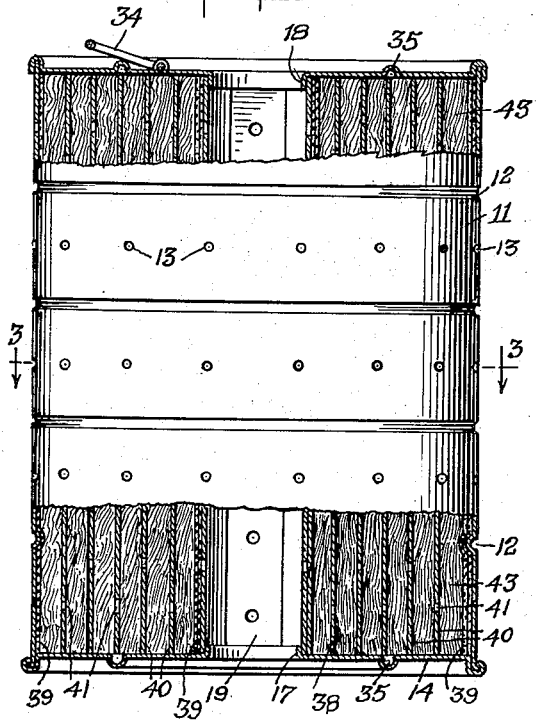
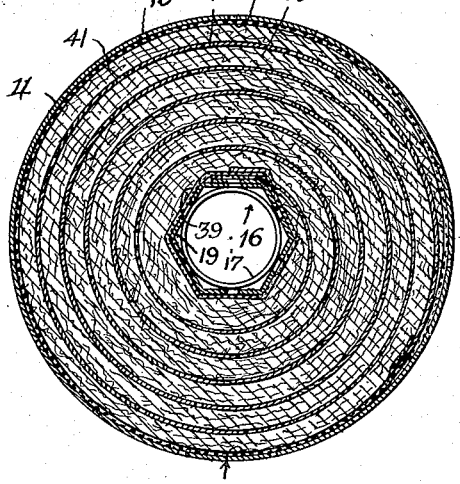
Inventor
Benjamin H. Von Pentz
By
Munn Liddy & Glaccum
Attorneys

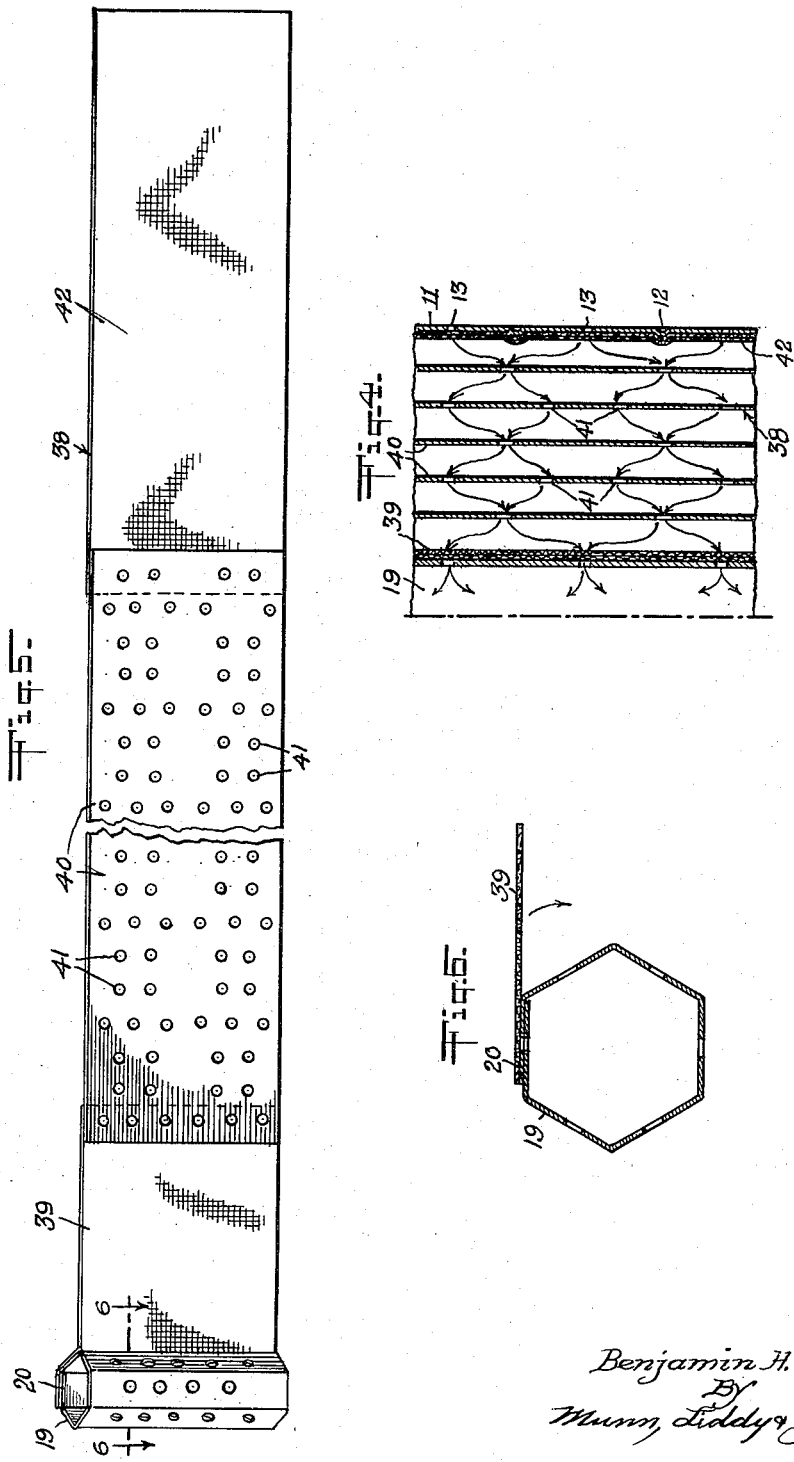

Patented Dec. 4, 1951

2,577,169

UNITED STATES PATENT OFFICE 2,577,169

OIL FILTER

Benjamin H. Von Pentz, Valley Stream, N. Y.

Application March 29, 1949, Serial No. 84,103

1 Claim. (Cl. 210—183)

This invention relates to oil filters and has for an object to provide an oil filter for use on automobile engines and similar engines wherein the filter quickly removes large particles of dirt and then removes the small impurities in the oil, including water, gasoline, and the like.

A further object of the invention is to provide an oil filter which is self-contained and readily removable for replacement purposes.

A further object of the invention is to provide an oil filter which presents a substantial surface through which oil can enter the filtering mediums and can be filtered with appreciable rapidity.

A still further object of the invention is to provide an oil filter through which the oil travels in the general direction of the transverse axis of the filter so that the oil travels through a substantial quantity of filtering mediums, thus insuring a greater degree of filtration.

Another object of the invention is to provide an oil filter which is so made that the oil enters through the sides rather than through the bottom so that sludge and other impurities can settle at the bottom of the casing and can be drained from such casing.

A further object of the invention is to provide an oil filter which has a perforated core with a lap seam so that the core can expand to keep the filtering mediums in frictional engagement with the container and with each other and so that the core can contract when the filtering mediums—becoming impregnated with oil—swell up. Such contracting prevents the collapse of the core or the container walls, or both.

With these and other objects in view, the invention consists in certain novel features of construction and combination which will be more fully hereinafter described and pointed out in the claim.

In the accompanying drawings—

Figure 1 is a longitudinal vertical sectional view through an oil filter, and casing in which such oil filter is mounted, disclosing an embodiment of the invention;

Fig. 2 is an enlarged view of the oil filter with a portion broken away to show the interior construction;

Fig. 3 is a transverse sectional view through Fig. 2 approximately on the line 3—3;

Fig. 4 is a fragmental view of a portion of Fig. 2 showing the course taken by the oil in the filtering process;

Fig. 5 is a view of the core and spiral band; and

Fig. 6 is a transverse sectional view through Fig. 5 approximately on line 6—6.

Referring to the accompanying drawings by numerals, 10 indicates the filtering device consisting of a metal container 11, the sides of which have a series of grooves 12 to give added strength, and a series of holes 13.

The bottom wall 14 and the top wall 15 of the container 11 each have in the center thereof one hole 16. These holes are concentric with each other and have flanges around their periphery, the flange 17 in the bottom wall 14 being bent upwardly and the flange 18 in the top wall 15 being bent downwardly. The perforated core 19 which has a lap seam 20 is mounted on the aforementioned flanges 17 and 18 in the center of the container 11. This core is preferably hexagonal.

The container 11 is mounted in the casing 21 and on the outlet pipe 22, which outlet pipe passes through the holes 16 and the core 19. The upper portion 23 of the outlet pipe 22 is threaded. The cap 24 is bolted onto the top of the casing 21 by means of the nut 25 which is threaded onto the upper portion 23 of the outlet pipe 22.

This cap 24 has flanges 26 which engage the flanges 27 of the casing 21. A sealed closure is maintained by the gasket 28. The spring 29 exerts an upward thrust to the filtering device 10 and the washers 30 and 31 provide a sealed closure between the outlet pipe 22 and the flange 17 of the hole 16. The extent of the upward thrust of the spring 29 is limited by the sleeve 32 which, in turn, keeps the washer 33 is pressure contact with the top wall 15 of the container 11. This washer 33 provides a sealed closure between the outlet pipe 22 and the flange 18 in the hole 16.

In the top wall 15 of the container 11 is an annular ring 34 which facilitates the lifting of the filtering device 10 out of the casing 21 after the cap 24 is removed. The bottom and top walls 14 and 15 of the container 11 are reinforced by ribs 35.

A drain plug 36 is inserted at the bottom of the casing 21 having for its purpose the draining of sediment and the like which settles at the bottom of the chamber 37.

The spiral band 38 shown in Fig. 5 consists of a portion of cloth 39, preferably loosely woven, one end of which is cemented to the core 19 and the other end of which is cemented to a strip of heavy paper 40. This paper is perforated with a series of staggered holes 41 and is impregnated with wax or the like. To the other end of the paper there is attached a piece of cloth 42 similar in texture to the cloth 39, but relatively longer. The impregnating with wax or the like will prevent the passage of the oil through the paper and cause the oil to pass only through the staggered holes.

On top of the spiral band 38 there is placed a layer 43 of filtering medium as, for instance, waste cotton or other filtering fiber in a more or less loose state.

The spiral band, with this layer 43, is wound around the perforated core 19. The core with the spiral band and filtering medium is then mounted inside the container 11, the bottom of the core engaging the flange 17 in the bottom wall 14. The top wall 15 then closes the container 11 with the top of the core 19 engaging the flange 18. The container is then mounted on the outlet pipe 22 inside the casing 21 and on top of the spring 29 and washers 30 and 31. The washer 33 and the sleeve 32 is then mounted at the top portion of outlet pipe 22 and the cap 24 is put on top of the casing 21. This cap is then sealed to the casing 21 by means of the gasket 28 and the nut 25.

In operation, oil enters the casing 21 under some pressure through the inlet pipe 44. This oil has no means of outlet other than through the holes 13 in the container 11 through which it enters the filtering device 10. By reason of the impregnation of the paper with wax or the like, the oil—after passing through a portion of the cloth and filtering medium and arriving at the paper—takes the path of least resistance, viz., goes through the holes 41. These holes, being staggered, the oil which is still under some pressure must follow a tortuous path as indicated by the arrows in Fig. 4 before it can reach the holes in the next layer of paper. Consequently, the oil which finally comes to the core 19 has traveled through a much greater amount of filtering medium than if it were allowed to pass in a direct transverse line from the outside container 11 to the core 19. Accordingly, the oil is filtered to a much greater degree. When the filtered oil passes through the perforations in the core 19, it flows out of the filtering device 10 and the casing 21 through outlet pipe 22 to a desired point.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of the appended claim.

I claim:

A filtering device which comprises a casing having an upper lateral inlet pipe, and a central lower outlet pipe in its bottom wall, a container disposed within said casing, and having imperforate top and bottom walls and a perforated peripheral wall, a filter element within the container comprising a central strip metal perforated core with unconnected overlapped edges, a band of spaced lengths of cloth with an intermediate length of impregnated paper with staggered holes therein, a layer of loose fibrous material laid along one face of said band, said band and material being rolled up around the core to fill the container, and a perforated pipe extending through said core and connected at its lower end to the outlet pipe in the casing.

BENJAMIN H. VON PENTZ.

REFERENCES CITED

The following references are of record in the file of this patent:

UNITED STATES PATENTS

| Number | Name | Date |
|---|---|---|
| 1,490,920 | Godward | Apr. 22, 1924 |
| 1,565,988 | Cottrell | Dec. 15, 1925 |
| 1,800,625 | Hall et al. | Apr. 14, 1931 |
| 1,898,027 | Winslow | Feb. 21, 1933 |
| 2,007,753 | Ericson | July 9, 1935 |
| 2,082,322 | Brundage | June 1, 1937 |
| 2,173,978 | Pennebaker | Sept. 26, 1939 |
| 2,272,583 | Reed | Feb. 10, 1942 |
| 2,325,399 | Houston | July 27, 1943 |
| 2,345,849 | Winslow et al. | Apr. 4, 1944 |
| 2,365,766 | Levier | Dec. 26, 1944 |
| 2,367,745 | Wicks | Jan. 23, 1945 |
| 2,427,733 | McCann | Sept. 23, 1947 |